(12) United States Patent
Se et al.

(10) Patent No.: US 11,359,838 B2
(45) Date of Patent: Jun. 14, 2022

(54) HEAT EXCHANGER AND MANUFACTURING METHOD THEREFOR

(71) Applicant: NORITZ CORPORATION, Hyogo (JP)

(72) Inventors: Naoki Se, Kobe (JP); Shoji Okuda, Kobe (JP); Hideyuki Fujisawa, Kobe (JP); Taihei Terasawa, Kobe (JP); Masaki Kondo, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 99 days.

(21) Appl. No.: 16/578,499

(22) Filed: Sep. 23, 2019

(65) Prior Publication Data

US 2020/0103142 A1 Apr. 2, 2020

(30) Foreign Application Priority Data

Sep. 27, 2018 (JP) .............................. JP2018-181269

(51) Int. Cl.
*F24H 9/14* (2006.01)
*F24H 1/14* (2022.01)
(Continued)

(52) U.S. Cl.
CPC ............. *F24H 9/146* (2013.01); *B21D 39/20* (2013.01); *B21D 53/06* (2013.01); *F16L 13/08* (2013.01);
(Continued)

(58) Field of Classification Search
CPC . F24H 9/146; F24H 1/145; F24H 8/00; F24H 1/41; B21D 53/06; B21D 39/20;
(Continued)

(56) References Cited

U.S. PATENT DOCUMENTS

| 8,256 A | * | 7/1851 | McCarty | ................ | B21D 39/20 |
|---|---|---|---|---|---|
| | | | | | 72/393 |
| 1,596,262 A | * | 8/1926 | Walker | .................. | B21D 39/12 |
| | | | | | 72/75 |

(Continued)

FOREIGN PATENT DOCUMENTS

| JP | S52-149658 A | 12/1977 |
|---|---|---|
| JP | S63-259395 A | 10/1988 |

*Primary Examiner* — Michael G Hoang
*Assistant Examiner* — Andrew W Cheung
(74) *Attorney, Agent, or Firm* — Studebaker & Brackett PC

(57) ABSTRACT

A heat exchanger includes a tube expansion portion formed by expanding a heat transfer tube so that an outer peripheral surface of the heat transfer tube is pressed against an inner peripheral surface of a hole provided in a side wall portion of a case. The tube expansion portion includes first and second bulge portions positioned respectively on the inside and the outside of the side wall portion so as to sandwich the side wall portion in an axial length direction of the heat transfer tube and configured such that respective outer peripheral surfaces thereof partially bulge outward in a radial direction of the heat transfer tube, an end portion tip end of the heat transfer tube is positioned apart from the second bulge portion, and the end portion tip end and a part in the vicinity thereof are expanded so as to be included in a part of the tube expansion portion. Thus, effects such as improving the precision with which the side wall portion of the case, the heat transfer tube, and a connecting tube are fitted to each other can be achieved, and as a result, the respective parts can be brazed easily and appropriately.

2 Claims, 6 Drawing Sheets

(51) Int. Cl.
- *B21D 53/06* (2006.01)
- *F16L 13/14* (2006.01)
- *F16L 13/08* (2006.01)
- *B21D 39/20* (2006.01)
- *F28F 9/16* (2006.01)

(52) U.S. Cl.
CPC .......... *F16L 13/147* (2013.01); *F24H 1/145* (2013.01); *F28F 9/16* (2013.01)

(58) Field of Classification Search
CPC ....... F16L 13/08; F16L 47/041; F16L 13/147; F28F 9/04; F28F 9/16; Y10T 29/4994
USPC .......................................... 29/523; 122/18.4
See application file for complete search history.

(56) References Cited

U.S. PATENT DOCUMENTS

| | | | | |
|---|---|---|---|---|
| 1,801,171 | A * | 4/1931 | Mueller | F16L 13/08 285/289.5 |
| 1,815,174 | A * | 7/1931 | Wiedeke | B21D 39/10 72/118 |
| 5,038,596 | A * | 8/1991 | Noonan | B23P 9/025 72/391.4 |
| 5,466,016 | A * | 11/1995 | Briody | B60K 15/04 220/86.2 |
| 7,448,652 | B2 * | 11/2008 | Poast | F16L 13/147 285/136.1 |
| 8,714,601 | B2 * | 5/2014 | Kawamata | B21D 41/026 285/382.5 |
| 2006/0157232 | A1 * | 7/2006 | Specht | F28F 9/16 165/134.1 |
| 2008/0236233 | A1 * | 10/2008 | Minor | B21D 41/02 72/112 |
| 2010/0044023 | A1 * | 2/2010 | Canales | F28D 1/0477 165/178 |
| 2010/0295296 | A1 * | 11/2010 | Kawamata | B21D 41/026 285/382.5 |
| 2013/0174404 | A1 * | 7/2013 | Bonnot | G21C 3/335 29/523 |
| 2013/0180109 | A1 * | 7/2013 | Hong | B21D 39/20 29/890.043 |
| 2016/0116228 | A1 * | 4/2016 | Huang | F24H 1/145 122/18.2 |
| 2017/0114932 | A1 * | 4/2017 | Nakajima | B23K 1/19 |
| 2020/0103182 | A1 * | 4/2020 | Hokada | F24H 8/00 |

* cited by examiner (a part of FIG. 4B)

The outer base end portion is the right side of the second bulge portion 22 and the inner base end portion is the left side of the second bulge portion 22.

HEAT EXCHANGER AND MANUFACTURING METHOD THEREFOR

BACKGROUND OF THE INVENTION

Field of the Invention

The present invention relates to a heat exchanger used in a water heating application or the like in a water heater, for example, and a manufacturing method therefor.

Description of the Related Art

Japanese Patent Application Publication No. S52-149658 and Japanese Patent Application Publication No. S63-259395, for example, describe heat exchangers.

The heat exchangers described in these documents are incorporated into water heaters or the like and used to heat water to be heated, and for this purpose, a plurality of heat transfer tubes are housed in a case to which a heating medium is supplied. Respective end portions of the plurality of heat transfer tubes are drawn out to the outside through holes provided in side wall portions of the case, and respective end portions of semicircular arc-shaped connecting tubes are fitted to these parts. As a result, the plurality of heat transfer tubes are connected in series via the connecting tubes so that water to be heated can flow from one end side to the other end side thereof. Brazing means, for example, is employed as means for fixing the heat transfer tubes to the side wall portions of the case and fixing the heat transfer tubes to the connecting tubes.

As described below, however, there remains room for improvement in the prior art described above.

When predetermined fitting locations on the side wall portions of the case, the heat transfer tubes, and the connecting tubes are brazed, it is necessary to improve the fitting precision of the parts to be brazed. Moreover, when the heat exchanger is transported into a brazing furnace, for example, it is desirable to fix the side wall portions and the heat transfer tubes provisionally as appropriate so that the positions thereof do not shift easily. Conventionally, however, achieving these aims easily and appropriately has been a problem that is difficult to solve.

CITATION LIST

Patent Literature 1: Japanese Patent Application Publication No. S52-149658
Patent Literature 2: Japanese Patent Application Publication No. S63-259395

SUMMARY OF THE INVENTION

An object of the present invention is to provide a heat exchanger with which the problems described above can be eliminated or suppressed as appropriate, and a manufacturing method therefor.

To solve the problems described above, the present invention employs the following technical means.

A heat exchanger provided by a first aspect of the present invention includes a case into which a heating medium is supplied, a plurality of heat transfer tubes drawn out to the outside from the interior of the case by inserting respective end portions thereof into a plurality of holes provided in a side wall portion of the case, a connecting tube, respective end portions of which are fitted to the end portions of the plurality of heat transfer tubes so as to connect the plurality of heat transfer tubes to each other, and a tube expansion portion formed by expanding each of the heat transfer tubes so that an outer peripheral surface of the heat transfer tube is pressed against an inner peripheral surface of the hole, wherein the tube expansion portion includes first and second bulge portions positioned respectively on the inside and the outside of the side wall portion so as to sandwich the side wall portion in an axial length direction of the heat transfer tube and configured such that respective outer peripheral surfaces thereof partially bulge outward in a radial direction of the heat transfer tube, an end portion tip end of the heat transfer tube is positioned apart from the second bulge portion, and the end portion tip end of the heat transfer tube and a part in the vicinity thereof are expanded so as to be included in a part of the tube expansion portion.

Preferably, the end portion tip end of the heat transfer tube and the part in the vicinity thereof form a flared portion having a flared shape.

The heat exchanger according to the present invention preferably further includes a brazed portion brazing the end portion tip end of the heat transfer tube to the connecting tube, wherein a part of the brazed portion advances into a gap formed between the end portion tip end and the connecting tube.

The heat exchanger according to the present invention preferably further includes a brazed portion brazing the second bulge portion to the side wall portion.

Preferably, the connecting tube is formed using a semi-circular arc-shaped bend pipe.

A manufacturing method for a heat exchanger provided by a second aspect of the present invention includes a fixing step for fixing a plurality of heat transfer tubes to a side wall portion of a case into which a heating medium is supplied in a state where end portions of the plurality of heat transfer tubes are inserted into a plurality of holes provided in the side wall portion, and a heat transfer tube connecting step for connecting the plurality of heat transfer tubes to each other after the fixing step by fitting respective end portions of a connecting tube to the end portions of the plurality of heat transfer tubes, wherein tube expansion processing is performed in the fixing step to form a tube expansion portion on each of the heat transfer tubes so that an outer peripheral surface of the heat transfer tube is pressed against an inner peripheral surface of the hole, and in the tube expansion processing, first and second bulge portions positioned respectively on the inside and the outside of the side wall portion so as to sandwich the side wall portion in an axial length direction of the heat transfer tube and configured such that respective outer peripheral surfaces thereof partially bulge outward in a radial direction of the heat transfer tube are formed, an end portion tip end of the heat transfer tube and the second bulge portion are disposed apart from each other, and the tube expansion processing is also performed on the end portion tip end and a part in the vicinity thereof.

Preferably, the tube expansion processing is performed using a divided punch having an expandable and contractable portion that can be inserted into each of the heat transfer tubes and expanded and contracted in a radial direction, first and second projecting portions for forming the first and second bulge portions and a tapered surface portion for implementing flaring processing on the end portion tip end and the part in the vicinity thereof being provided on an outer peripheral surface of the expandable and contractable portion, and during the tube expansion processing, an operation for forming the first and second bulge portions and the flaring processing are performed simultaneously.

Preferably, the expandable and contractable portion of the divided punch is formed by combining a plurality of segments formed as separate members, and an outline of an overall sectional shape formed by the plurality of segments takes a shape more closely approximating a perfect circle or an arc thereof when tube expansion is underway than when tube expansion is not underway.

Other features and advantages of the present invention will become more apparent from the embodiment of the invention to be described below with reference to the attached figures.

DETAILED DESCRIPTION OF THE PREFERRED EMBODIMENTS

A preferred embodiment of the present invention will be described specifically below with reference to the figures.

Figure 1:
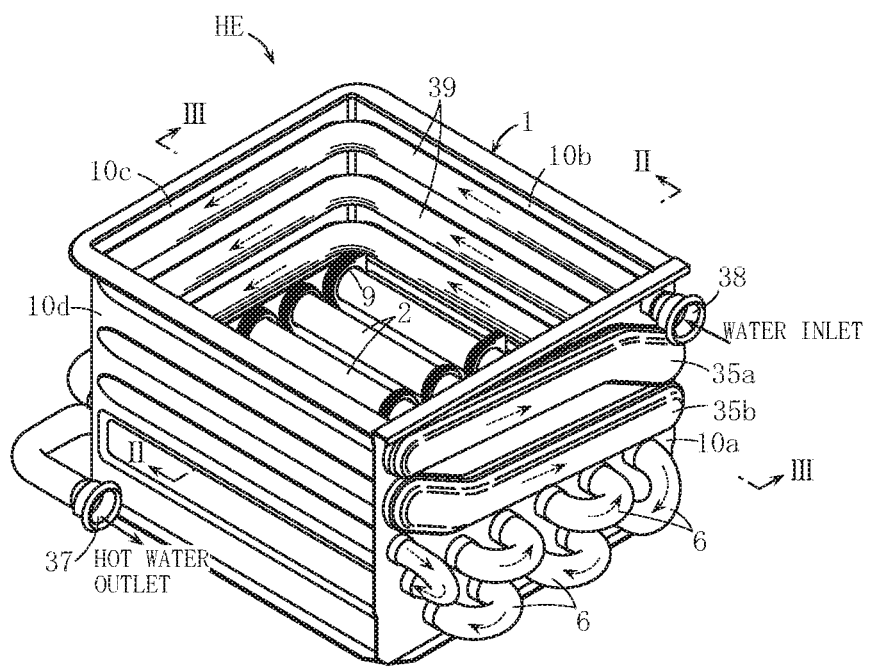
FIG. 1 is a perspective view showing an example of a heat exchanger according to the present invention.

A heat exchanger HE shown in FIG. 1 is incorporated into a water heater, for example, and used to heat water to be heated for use in a hot water supply. The heat exchanger HE includes a substantially rectangular frame-shaped case 1 that is open at the top and bottom, a plurality of trunk pipes 39 housed therein, a plurality of fins 9, a plurality of heat transfer tubes 2, and a plurality of connecting tubes 6 connecting the plurality of heat transfer tubes 2 to each other. The heat exchanger HE is used in a so-called reverse combustion type water heater, in which a burner (not shown) is disposed above the case 1 and combustion gas (an example of a heating medium) generated by the burner is supplied into the case 1 and advances downward. The water to be heated, which passes through the trunk pipes 39 and the plurality of heat transfer tubes 2, is heated by the combustion gas.

The plurality of trunk pipes 39, as well as absorbing heat for the purpose of heating the water to be heated, function to cool a plurality of side wall portions 10b to 10d of the case 1, and are provided along respective inner surfaces of the plurality of side wall portions 10b to 10d. The plurality of trunk pipes 39 are connected via header portions 35a, 35b provided on an outer surface portion of the side wall portion 10a of the case 1. As indicated by dotted line arrows in FIG. 1, water to be heated, having been supplied to a water inlet 38 of the trunk pipes 39, passes through the trunk pipes 39 and the plurality of header portions 35a, 35b, then flows into the plurality of heat transfer tubes 2, and having passed through the plurality of heat transfer tubes 2, reaches a hot water outlet 37.

Figure 2:
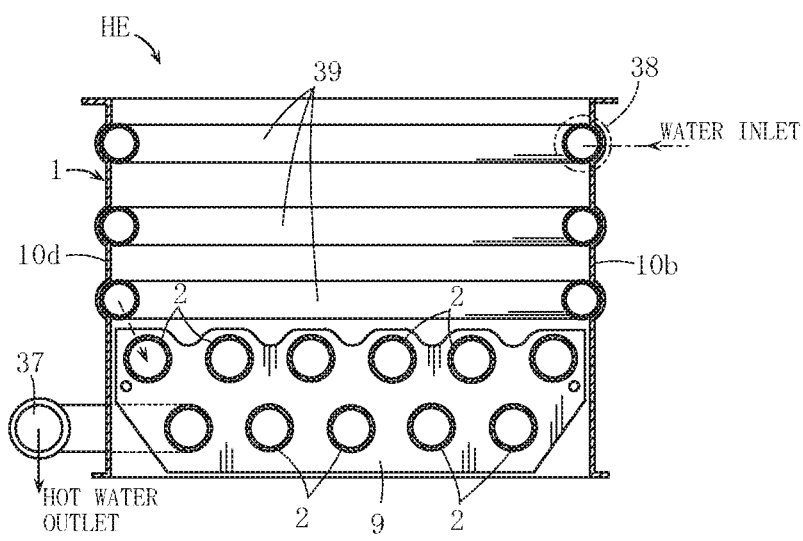
FIG. 2 is a II-II sectional view of FIG. 1.
Figure 3:
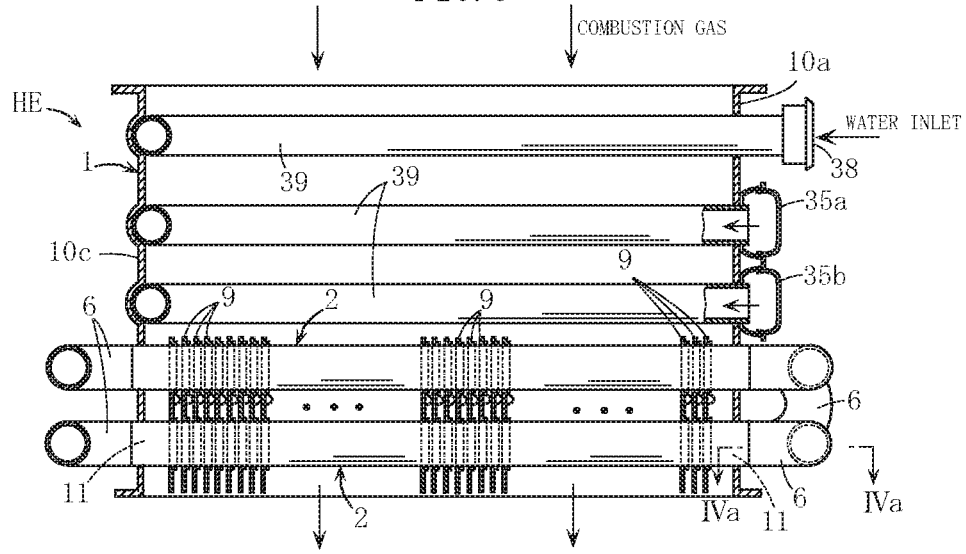
FIG. 3 is a III-III sectional view of FIG. 1.

As shown in FIGS. 2 and 3, the plurality of heat transfer tubes 2 are fin tubes inserted into and bonded to the plurality of fins 9, for example, and are laid horizontally inside the case 1 so as to be arranged in respective pluralities in vertical and horizontal directions. Respective end portions of the heat transfer tubes 2 are inserted into holes 11 provided in the side wall portions 10a, 10c of the case 1 and drawn out to the outside of the case 1. The plurality of connecting tubes 6 are formed using semicircular arc-shaped bend pipes, for example. Respective end portions of the connecting tubes 6 are fitted and connected to the end portions of the plurality of heat transfer tubes 2. As a result, the plurality of heat transfer tubes 2 are connected in series via the plurality of connecting tubes 6.

Figure 4A:
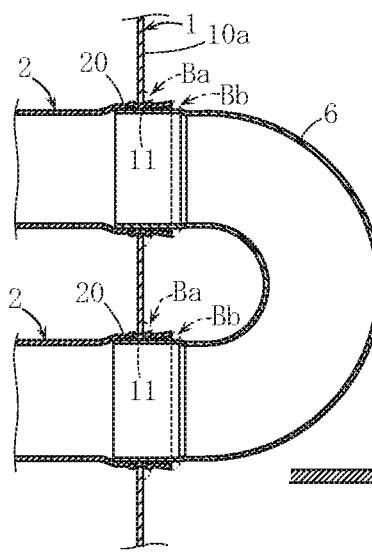
FIG. 4A is an enlarged IVA-IVA sectional view showing the main parts of FIG. 3.
Figure 4B:
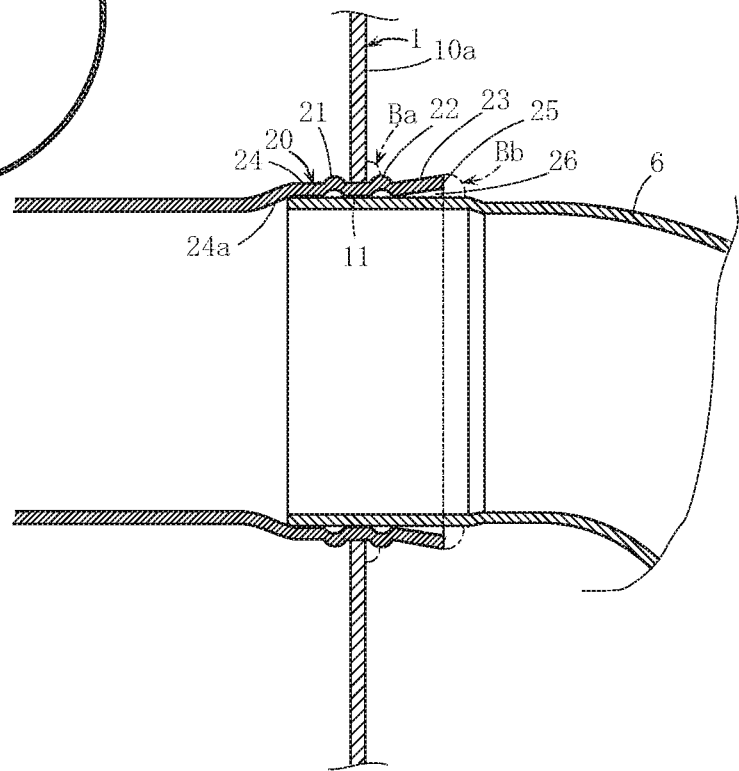
FIG. 4B is a partially enlarged sectional view of FIG. 4A.

As shown in FIGS. 4A and 4B, each heat transfer tube 2 is provided with a tube expansion portion 20 having an outer diameter and an inner diameter that are larger than the other parts of the heat transfer tube 2. The tube expansion portion 20 includes first and second bulge portions 21, 22, a flared portion 23, and an auxiliary portion 24.

The first and second bulge portions 21, 22 are annular bulge portions positioned respectively on the inside and the outside of the side wall portion 10a of the case 1 so as to sandwich the side wall portion 10a in an axial length direction of the heat transfer tube 2 and configured such that respective outer peripheral surfaces thereof partially bulge outward in a radial direction of the heat transfer tube 2. The first and second bulge portions 21, 22 are preferably disposed in contact with the side wall portion 10a. A region of the tube expansion portion 20 between the first and second bulge portions 21, 22 is pressed against an inner peripheral surface of the hole 11.

The flared portion 23 is a part in which an end portion tip end 25 of the heat transfer tube 2 and a part in the vicinity thereof are flared. The second bulge portion 22 and the end portion tip end 25 of the heat transfer tube 2 are disposed apart from each other, thereby securing a region for providing the flared portion 23. The auxiliary portion 24 of the tube expansion portion 20 is a part positioned further toward the inside of the case 1 than the first bulge portion 21, and a step 24a is formed on the inside of a base portion of the auxiliary portion 24. The end portion of the connecting tube 6 is inserted into (fitted to) the heat transfer tube 2, but the end portion of the connecting tube 6 contacts the step 24a, thereby preventing the connecting tube 6 from advancing deeper into the heat transfer tube 2. Tube expansion processing is preferably also implemented on the end portion of the connecting tube 6, and the end portion of the connecting tube 6 forms a part having a high degree of circularity as a round pipe and a high degree of outer diameter dimension precision.

The connecting tube 6 is inserted into the heat transfer tube 2 so that the end portion thereof is positioned further toward the inside of the case 1 than the side wall portion 10a. In so doing, a similar effect to that obtained by adding the end portion of the connecting tube 6 to a bonding location between the heat transfer tube 2 and the side wall portion 10a as a reinforcing member is achieved, leading to an increase in strength in the bonding location between the heat transfer tube 2 and the side wall portion 10a. An effect of improving the strength of a bonding location between the connecting tube 6 and the heat transfer tube 2 is also achieved.

As shown in FIGS. 4A and 4B, the heat exchanger HE according to this embodiment is provided with brazed portions Ba, Bb. The brazed portion Ba is a part where the vicinity of the second bulge portion 22 is brazed to the side wall portion 10a. The brazed portion Bb is a part where the end portion tip end 25 of the heat transfer tube 2 is brazed to an outer peripheral surface of the connecting tube 6. A part of the brazed portion Bb advances into a tip end opening 26 of the heat transfer tube 2 (a gap formed between the end portion tip end 25 and the connecting tube 6). The configuration described above is applied similarly to a relationship between the side wall portion 10c of the case 1 and the end portion of the heat transfer tube 2, and a relationship between the connecting tube 6 positioned on the side wall portion 10c side and the heat transfer tube 2.

Next, an example of a method for manufacturing the above heat exchanger HE will be described.

A divided punch 5 such as that shown in FIGS. 5A to 6C is used to manufacture the heat exchanger HE. To facilitate understanding, the divided punch 5 will be described first.

Figure 5A:
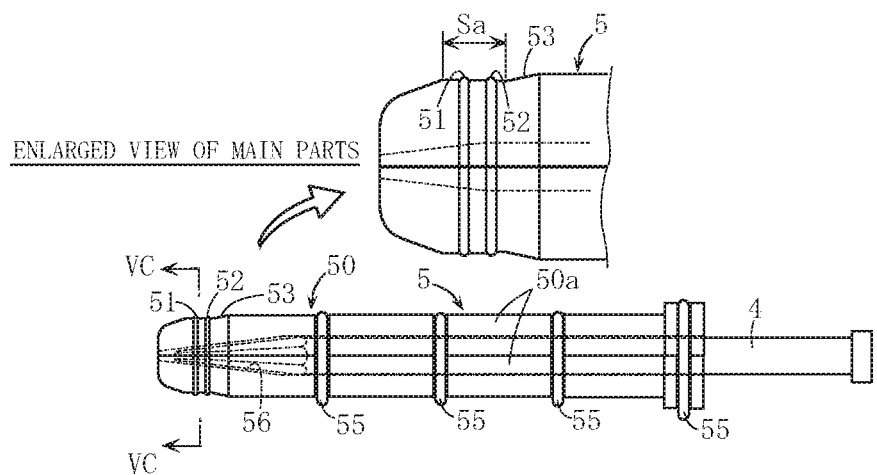
FIG. 5A is a front view showing an example of a divided punch used in a tube expansion operation in an unexpanded state.
Figure 5B:
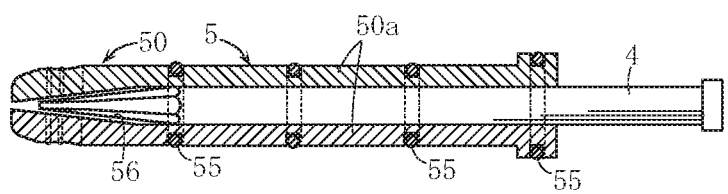
FIG. 5B is a front sectional view thereof.

The divided punch 5 is formed in a tubular shape and has a mandrel 4 inserted into the interior thereof. Note, however, that the divided punch 5 is not constituted by a single member. More specifically, the divided punch 5 is formed by combining a plurality of segments 50a in a bundle and fitting a plurality of stretchable O-rings 55 to the exterior thereof so that the plurality of segments 50a are constrained and prevented from separating. The plurality of segments 50a form a configuration corresponding to a component obtained by cutting a substantially cylindrical member along an axial length direction thereof so as to divide the member into six or another number of members, for example. A tapered inclined surface 56 is provided on an inner peripheral surface near a tip end of the divided punch 5. Hence, when the mandrel 4 is inserted so as to press against the inclined surface 56, as shown in FIGS. 6A to 6C, substantially the entire divided punch 5 expands in a radial direction against the elastic force of the O-rings 55. When the mandrel 4 is withdrawn, the divided punch 5 is returned to its original, unexpanded state, as shown in FIGS. 5A to 5C, by the elastic force of the O-rings 55.

Figure 8A:
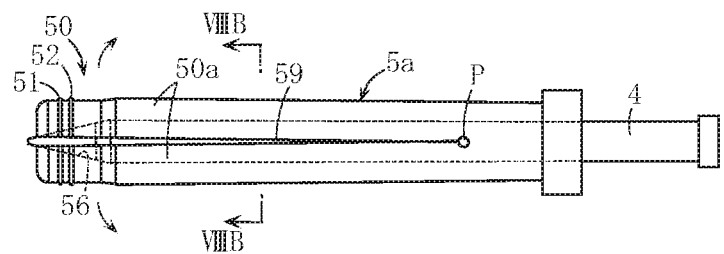
FIG. 8A is a front view showing another example of the divided punch.
Figure 8B:
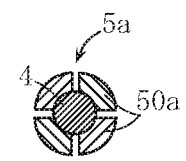
FIG. 8B is a VIIIB-VIIIB sectional view of FIG. 8A.
Figure 9:
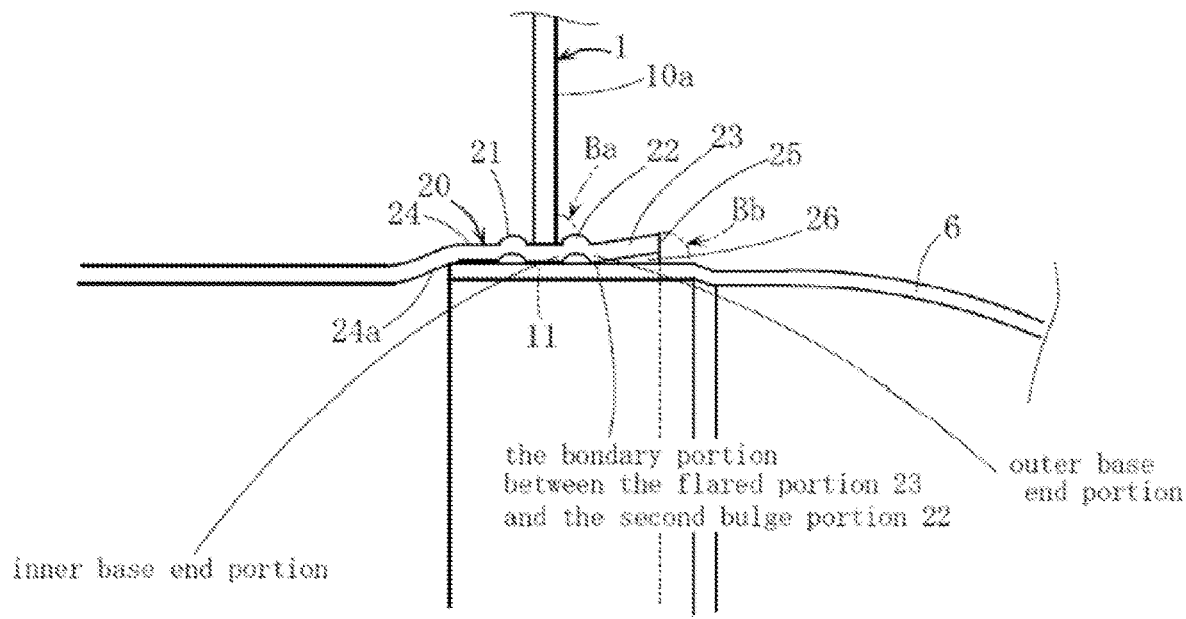
FIG. 9 shows a portion of FIG. 4B, with annotations.

The divided punch 5 according to this embodiment, in contrast to a divided punch 5a to be described below with reference to FIGS. 8A and 8B, is formed by combining the plurality of separate segments 50a, and therefore the entire region thereof forms an expandable and contractable portion 50. A tip end of the mandrel 4 preferably has a tapered shape such as a conical shape or a pyramid shape. More preferably, the tip end of the mandrel 4 is formed in a pyramid shape so as to include a plurality of planar portions 40 that are capable of surface contact with planar inner surfaces 50b of the plurality of segments 50a.

Figure 5C:
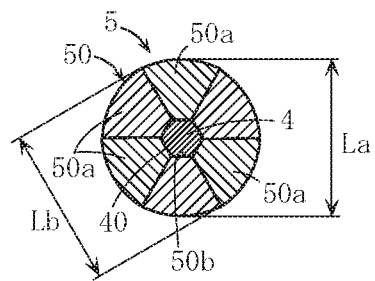
FIG. 5C is a VC-VC sectional view of FIG. 5A.
Figure 6A:
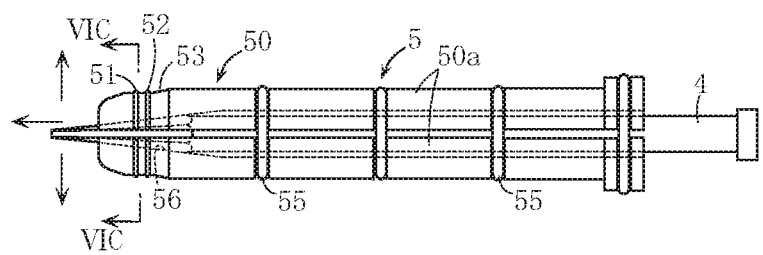
FIG. 6A is a front view showing an example of the divided punch shown in FIG. 5A in an expanded state.
Figure 6B:
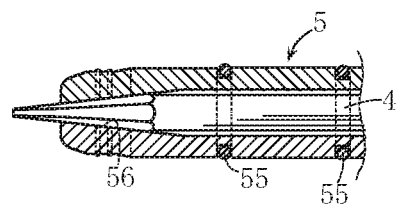
FIG. 6B is a front sectional view showing the main parts thereof.
Figure 6C:
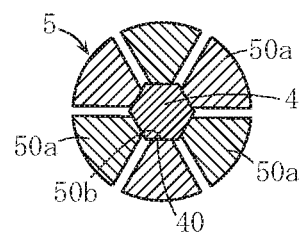
FIG. 6C is a VIC-VIC sectional view of FIG. 6A.

When the divided punch 5 is in the unexpanded state, as shown in FIG. 5C, the outline of an overall sectional shape formed by the plurality of segments 50a of the divided punch 5 is, strictly speaking, non-circular. For example, a vertical width La differs from a diagonal width Lb. When the divided punch 5 is expanded, however, as shown in FIG. 6C, the outline of the overall sectional shape formed by the plurality of segments 50a is circular (either a perfect circle or a shape approximating a perfect circle). Hence, the divided punch 5 is configured to take a shape more closely approximating a perfect circle or an arc thereof when expanded (when tube expansion is underway) than when not expanded (when tube expansion is not underway).

As is evident from the enlarged view of main parts in FIG. 5A, substantially annular first and second projecting portions 51, 52 and a tapered surface portion 53 are provided on an outer peripheral surface of the divided punch 5 near the tip end. The first and second projecting portions 51, 52 are sites for forming the first and second bulge portions 21, 22 of the heat transfer tube 2, described above. The tapered surface portion 53 is a site for forming the flared portion 23. In the enlarged view of main parts in FIG. 5A, an outer peripheral surface region denoted by a reference symbol Sa is a region in which an outer diameter of each location, excluding the first and second projecting portions 51, 52, is identical.

Figure 7A:
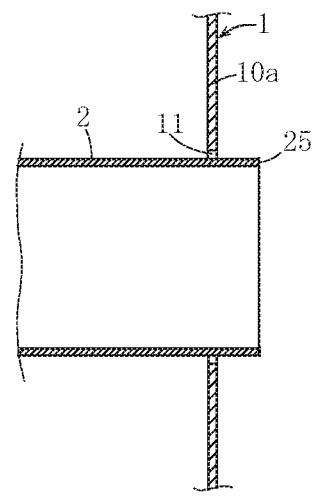
FIGS. 7A to 7C are sectional views showing main parts of an example of a tube expansion operation performed on a heat transfer tube.
Figure 7B:
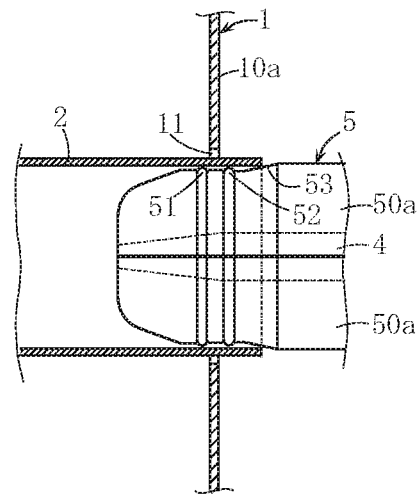
Figure 7C:
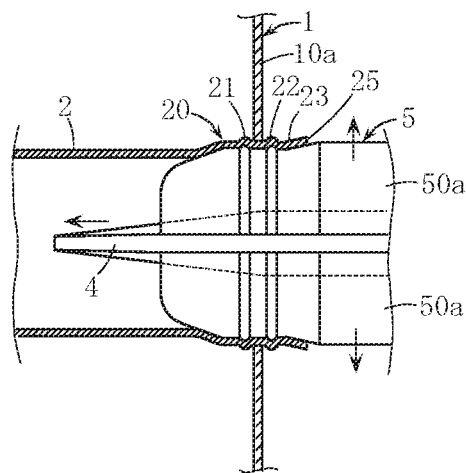

When manufacturing the heat exchanger HE, the divided punch 5 described above is used to implement a tube expansion operation on the heat transfer tube 2 through procedures such as those shown in FIGS. 7A to 7C.

First, in a state where the end portion of the heat transfer tube 2 is inserted into the hole 11 in the side wall portion 10a of the case 1, as shown in FIG. 7A, the divided punch 5 is inserted into the end portion of the heat transfer tube 2, as shown in FIG. 7B. Next, as shown in FIG. 7C, the divided punch 5 is expanded in order to expand the end portion of the heat transfer tube 2. In so doing, the tube expansion portion 20 described with reference to FIGS. 4A and 4B can be provided on the heat transfer tube 2, and the heat transfer tube 2 can be fixed (provisionally fixed) to the side wall portion 10a. Next, after returning the divided punch 5 to its original size, the divided punch 5 is withdrawn from the heat transfer tube 2, whereupon the end portion of the connecting tube 6 is inserted into the end portion of the heat transfer tube 2. This operation is performed on each of the plurality of heat transfer tubes 2, but by using a plurality of divided punches 5, the operation can be performed on the plurality of heat transfer tubes 2 simultaneously. Once the processes described above are complete, a brazing operation is performed to provide the brazed portions Ba, Bb described above.

With the heat exchanger HE according to this embodiment, the following effects are obtained.

The tube expansion portion 20 is provided on the heat transfer tube 2, and an outer peripheral surface thereof is pressed against the inner peripheral surface of the hole 11 provided in the side wall portion 10a (10c) of the case 1. In addition, the first and second bulge portions 21, 22 are provided on either side of the side wall portion 10a. Thus, the heat transfer tube 2 can be fixed (provisionally fixed prior to brazing) to the side wall portion 10a appropriately, and a favorable degree of fitting precision can be achieved between the heat transfer tube 2 and the hole 11. As a result, the brazed portion Ba can be formed appropriately.

Further, by forming the flared portion 23 on the end portion tip end 25 of the heat transfer tube 2 and the part in the vicinity thereof, the dimensional precision of this part can be improved, and a favorable degree of fitting precision can be achieved between the heat transfer tube 2 and the connecting tube 6. As a result, the brazed portion Bb can also be formed appropriately. When the first and second bulge portions 21, 22 are formed close to the end portion tip end 25 of the heat transfer tube 2, there is a danger that the aperture of the end portion tip end 25 and the part in the vicinity thereof will decrease in reaction thereto. According to this embodiment, however, this danger can be eliminated appropriately. Furthermore, by providing the flared portion 23 on the heat transfer tube 2, the operation for inserting the connecting tube 6 into the heat transfer tube 2 can be performed easily.

According to the manufacturing method for the heat exchanger HE described above, meanwhile, the following effects are obtained.

The tube expansion portion 20, including the first and second bulge portions 21, 22, the flared portion 23, and so on, can be provided appropriately by performing a single tube expansion operation using the divided punch 5. As a result, the productivity of the heat exchanger HE is improved, which is a desirable effect. As described with reference to FIGS. 6A to 6C, the divided punch 5 is configured so that when expanded (during tube expansion), the outline of the overall sectional shape formed by the plurality of segments 50a takes a shape closely approximating a perfect circle or an arc thereof. As a result, the circularity and dimensional precision of the respective parts of the tube expansion portion 20 can be improved, which is a desirable effect.

FIGS. 8A and 8B show another example of the divided punch used in the tube expansion operation. In these figures, identical or similar elements to the embodiment described above have been allocated identical reference numerals to the embodiment, and duplicate description thereof has been omitted.

A divided punch 5a shown in FIGS. 8A and 8B is basically formed in a substantially cylindrical shape with the mandrel 4 inserted into the interior thereof. However, a plurality of slits 59 extending in the axial length direction are provided in a peripheral wall portion of the divided punch 5a so that a plurality of divided segments 50a are formed by the plurality of slits 59. A tip end portion of the divided punch 5a forms the expandable and contractable portion 50, and when the inclined surface 56 on the inside of the tip end portion of the divided punch 5a is pressed by inserting the mandrel 4, the plurality of segments 50a are pushed so as to spread out in the radial direction, whereby the expandable and contractable portion 50 expands. The first and second projecting portions 51, 52 are provided on an outer peripheral surface of the expandable and contractable portion 50 (the tapered surface portion 53 has been omitted from the figures).

Likewise when the divided punch 5a described above is used in place of the divided punch 5 according to the embodiment, the tube expansion portion of the present invention can be provided on the heat transfer tube by a single tube expansion process.

Note that with the divided punch 5a, when the expandable and contractable portion 50 expands, the plurality of segments 50a open about respective base end portions P of the slits 59, and therefore the circularity of the outline of the overall sectional shape formed by the plurality of segments 50a is lower than when tube expansion is not underway. In order to increase the circularity of the tube expansion portion 20, therefore, the divided punch 5 according to the embodiment described above is preferably used. The present invention is not limited thereto, however.

The present invention is not limited to the content of the embodiment described above, and the specific configurations of the respective parts of the heat exchanger according to the present invention may be freely subjected to various design modifications within the intended scope of the present invention. The specific configurations of the respective processes of the manufacturing method for a heat exchanger according to the present invention may be modified freely within the intended scope of the present invention.

In the above embodiment, the end portion tip end 25 of the heat transfer tube 2 and the part in the vicinity thereof form the flared portion 23, but the present invention is not limited thereto, and these parts may form a non-flared tube expansion portion having a constant diameter, for example.

The heat transfer tube is not limited to a linear tube shape, and a meandering tube, a spiral tube, or the like may be used instead. The trunk pipe 39 of the embodiment described above may also be included in the heat transfer tube according to the present invention. Not all of the plurality of heat transfer tubes provided in the heat exchanger need have the intended configuration of the present invention, and as long as the attachment structure of some of the heat transfer tubes has the intended configuration of the present invention, this configuration belongs to the technical scope of the present invention.

The heat exchanger according to the present invention is not limited to a so-called reverse combustion system and may employ a so-called normal combustion system (a system in which the burner is disposed on the lower side of the heat exchanger and the combustion gas is caused to advance upward), for example, instead. Moreover, a configuration not including the trunk pipes may be employed. The heat exchanger is not limited to use in a water heater.

The heating medium is not limited to combustion gas, and high-temperature exhaust gas generated in a cogeneration system or the like, for example, may be used instead.

The invention claimed is:

1. A manufacturing method for a heat exchanger, comprising:
    a fixing step for fixing a plurality of heat transfer tubes to a side wall portion of a case into which a heating medium is supplied in a state where end portions of the plurality of heat transfer tubes are inserted into a plurality of holes provided in the side wall portion; and
    a heat transfer tube connecting step for connecting the plurality of heat transfer tubes to each other after the fixing step by fitting respective end portions of a connecting tube to the end portions of the plurality of heat transfer tubes, wherein
    tube expansion processing is performed in the fixing step to form a tube expansion portion on each of the heat transfer tubes such that an outer peripheral surface of the heat transfer tube is pressed against an inner peripheral surface of the hole,
    in the tube expansion processing, first and second bulge portions positioned respectively on an inside and an outside of the side wall portion so as to sandwich the side wall portion in an axial length direction of the heat transfer tube and configured such that respective outer peripheral surfaces thereof partially bulge outward in a radial direction of the heat transfer tube are formed,
    an end portion tip end of the heat transfer tube and the second bulge portion are disposed apart from each other, and the tube expansion processing is also performed on the end portion tip end and a part of a flared portion of the heat transfer tube connected to the end portion tip end and extending to the second bulge portion,
    the flared portion has a flared shape,
    the tube expansion portion includes an auxiliary portion, the first and second bulge portions, and the flared portion,
    the second bulge portion has a shape in which a region between an inner base end portion and an outer base end portion separated in an axial length direction of the heat transfer tube bulges outward in a radial direction of the heat transfer tube, a boundary portion between the flared portion and the second bulge portion, which corresponds to the outer base end portion of the second bulge portion, is not located on an outer side in the radial direction of the heat transfer tube compared to the inner base end portion of the second bulge portion, such that an inner diameter of the inner base end portion is the same as an inner diameter of the boundary portion, of the tube expansion portion, the auxiliary portion, the region between the first and second bulge portions, and the boundary portion are in contact with an outer peripheral surface of the connecting tube, the tube expansion processing is performed using a divided punch having an expandable and contractable portion that are insertable into each of the heat transfer tubes and expandable and contractable in a radial direction, first and second projecting portions for forming the first and second bulge portions and a tapered surface portion for implementing flaring processing on the end portion tip end and the part of the flared portion of the heat transfer tube connected to the end portion tip end and extending to the second bulge portion being provided on an outer peripheral surface of the expandable and contractable portion, and during the tube expansion processing, an operation for forming the first and second bulge portions and the flaring processing are performed simultaneously.

2. The manufacturing method for a heat exchanger according to claim 1, wherein the expandable and contractable portion of the divided punch is formed by combining a plurality of segments formed as separate members, and an outline of an overall sectional shape formed by the plurality of segments takes a shape more closely approximating a perfect circle or an arc thereof when tube expansion is underway than when tube expansion is not underway.

* * * * *